(12) United States Patent
Saito et al.

(10) Patent No.: US 6,388,548 B1
(45) Date of Patent: May 14, 2002

(54) NON-CONTACT TRANSFORMER AND VEHICULAR SIGNAL RELAY APPARATUS USING IT

(75) Inventors: Yoshitaka Saito, Sendai; Hideki Masudaya, Furukawa, both of (JP)

(73) Assignees: Tokin Corp., Miyagi; Alps Electric Co., Ltd., Tokyo, both of (JP)

( * ) Notice: Subject to any disclaimer, the term of this patent is extended or adjusted under 35 U.S.C. 154(b) by 0 days.

(21) Appl. No.: 09/560,045

(22) Filed: Apr. 27, 2000

(30) Foreign Application Priority Data

Apr. 28, 1999 (JP) .......................... 11-123137

(51) Int. Cl.7 .......................... H01F 21/04; H01F 21/06
(52) U.S. Cl. .......................... 336/90; 336/117; 336/120; 336/131
(58) Field of Search .......................... 363/90, 98, 117, 363/120, 130, 131

(56) References Cited

U.S. PATENT DOCUMENTS 5,347,258 A * 9/1994 Howard et al. .............. 338/333
5,412,366 A * 5/1995 Ohji et al. .................. 336/120

FOREIGN PATENT DOCUMENTS

JP  11-354346  * 12/1999
JP  11-354348  * 12/1999

* cited by examiner

*Primary Examiner*—Anh Mai
(74) *Attorney, Agent, or Firm*—Hopgood, Calimafde, Judlowe & Mondolino

(57) ABSTRACT

It is intended to provide a non-contact transformer which simplifies attachment work, causes no sound of rubbing between wires or resistance during steering wheel manipulation, increases the transmission efficiency, and can be manufactured easily by virtue of a minimized warp occurring during manufacture of a core. A non-contact transformer is provided that includes two disc-shaped magnetic cores (19) each having at least one concentric and radial groove (21), and a magnetic sleeve (25) having a cylindrical shape or a pot shape having an opening at the center of the bottom surface. The two magnetic cores are opposed to each other with a predetermined distance left therebetween in a space enclosed by the magnetic sleeve. A wining (23) of wire is accommodated in the at least one concentric groove. Each of the magnetic cores is a combination of a plurality of fan-shaped partial cores (27) to be formed in a disc shape.

14 Claims, 6 Drawing Sheets

NON-CONTACT TRANSFORMER AND VEHICULAR SIGNAL RELAY APPARATUS USING IT

BACKGROUND OF THE INVENTION

1. Field of the Invention

The present invention relates to non-contact transformers, more specifically, to non-contact transformers each of which is mounted around the shaft of a steering wheel portion of a four-wheel automobile and performs power supply and signal transmission in the handle portion as well as to a vehicular signal relay apparatus using such a non-contact transformer.

2. Description of the Related Art

At present time, automobiles are spread all over the world. There are many kinds of automobiles having an air-conditioner and a cruise control apparatus. The manipulation system of most of the electric system of such equipment is concentrated near the front panel and the base of the steering wheel. Therefore, to manipulate such an electric system, the driver needs to take one of his hands off the steering wheel though temporarily, which may cause an erroneous steering wheel manipulation and possibly a serious accident during high-speed driving etc.

To cope with the above problem, safety-oriented four-wheel automobiles are spreading in which control switches of an electric system is provided in a steering wheel portion and the driver need not take his hands off the steering wheel even during manipulation. In this case, exchange of electricity with the manipulation system in the steering wheel portion is performed in a wired manner and flexible wires having resilience are used to prevent disconnection by steering wheel rotation manipulations.

However, in the above wired electric system, attachment of flexible wires is very laborious work because the wires need to be located at neutral positions to assure uniform rightward and leftward steering wheel rotation manipulations.

Since the wires rub against each other during steering wheel manipulations, the product life is short. Further, Some users insist that sound of rubbing between the wires and slight resistance that occurs during manipulations make driving less comfortable.

The inventors attempted to solve the above problems by employing, instead of wired ones, electromagnetic induction type power supply and signal transmission using a non-contact transformer having a ferrite core. However, manufacture of such an electric system was difficult because the core was large and hence was warped during sintering.

SUMMARY OF THE INVENTION

It is an object of the present invention to provide a non-contact transformer which simplifies attachment work and causes no sound of rubbing between wires or resistance during steering wheel manipulations.

It is another object of the invention is to provide a non-contact transformer which can increase the transmission efficiency as well as can be manufactured easily by virtue of a minimized warp of a core that occurs during its manufacture.

It is still another object of the invention to provide a non-contact transformer which is free of such problems as cracking during assembling work and hence can greatly facilitate the assembling work.

It is yet another object of the invention to provide a non-contact transformer which suppresses adverse effects of external noise waves on signal transmission and thereby provides high stability of signal transmission.

It is a further object of the invention to provide a vehicular signal relay apparatus having any of the above non-contact transformers in a steering wheel portion.

According to a first aspect of the invention, there is provided a vehicular signal relay apparatus in which a non-contact transformer is accommodated in a steering wheel portion of a vehicle to relay an electric signal or power. The non-contact transformer comprises a winding of wire, two disc-shaped magnetic cores each having at least one concentric groove in which the winding is accommodated, and at least one magnetic sleeve that covers at least outer circumferences of the two magnetic cores. In the aspect of the present invention, the two magnetic cores are opposed to each other with a predetermined interval with a space interposed in between that is enclosed by the magnetic sleeve.

According to another aspect of the invention, there is provided a non-contact transformer which comprises a winding of wire, two disc-shaped magnetic cores each having at least one concentric groove in which the winding is accommodated, and at least one magnetic sleeve that covers at least outer circumferences of the two magnetic cores, where the two magnetic cores are opposed to each other with a predetermined interval with a space interposed in between that is enclosed by the magnetic sleeve.

DETAILED DESCRIPTION OF THE PREFERRED EMBODIMENTS

To facilitate understanding of the invention, a conventional wired electric system will be described with reference to FIG. 1 before the description of embodiments of the present invention.

Figure 1:
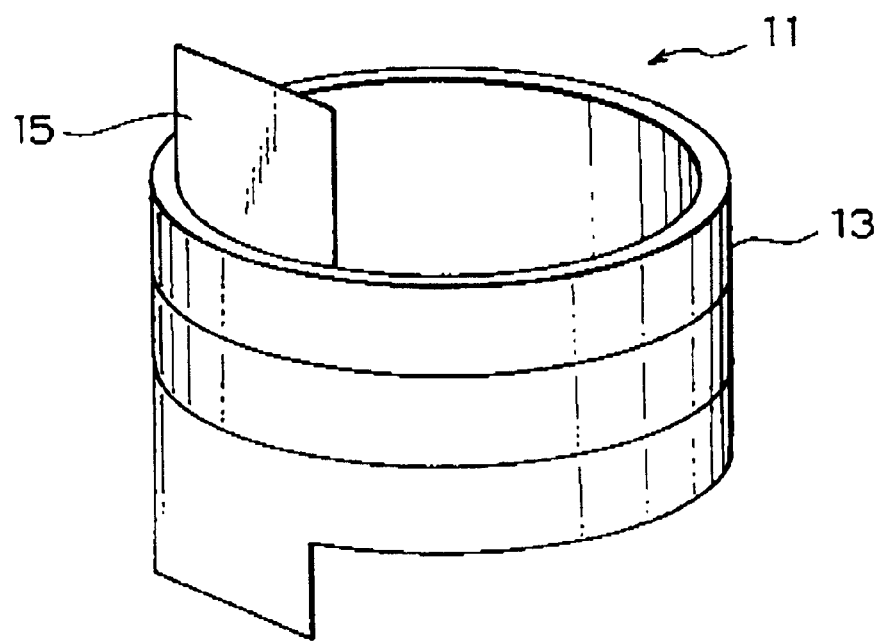
FIG. 1 is a perspective view outlining the configuration of a conventional wired electric system.

Referring to FIG. 1, a wired electric system 11 is configured in such a manner that a flat cable 13 having a plurality of parallel wires is rounded, so that steering wheel rotation does not cause any tension in the wires and hence the wires are prevented from disconnection. Reference numeral 15 denotes flat cable attachment electrodes.

Embodiments of the invention will now be described with reference to FIGS. 2A–2B to 6.

Figure 2A:
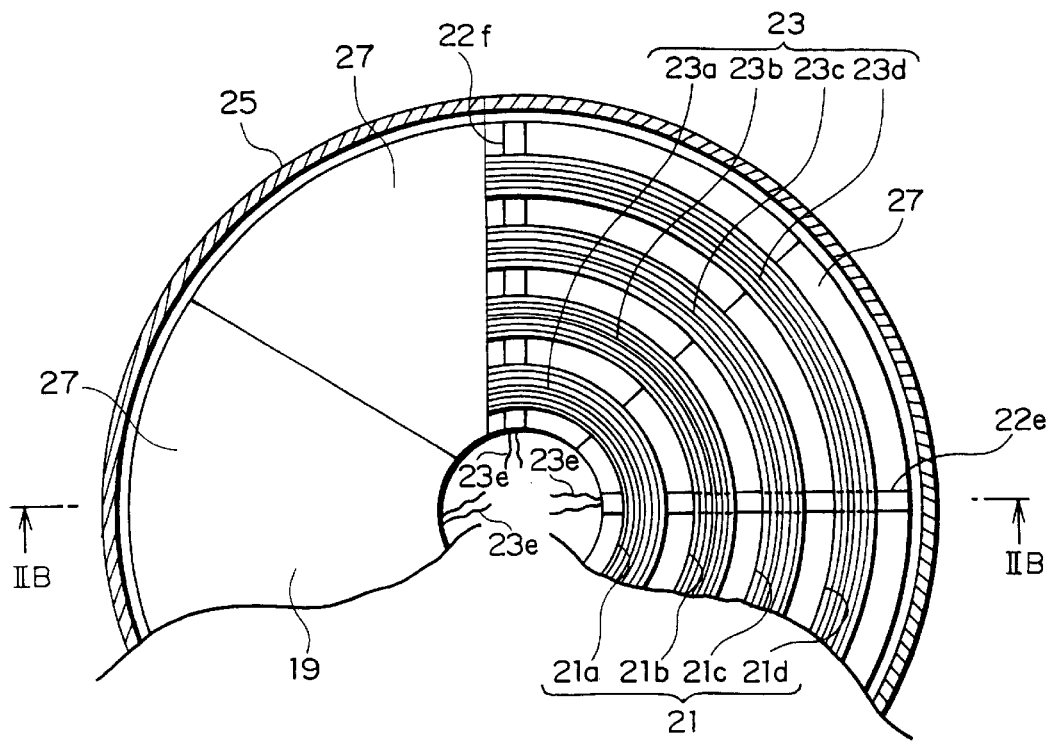
FIG. 2A is a partial plan sectional view of a non-contact transformer as a first basic structure according to the present invention taken along a line IIA—IIA in FIG. 2B.
Figure 2B:
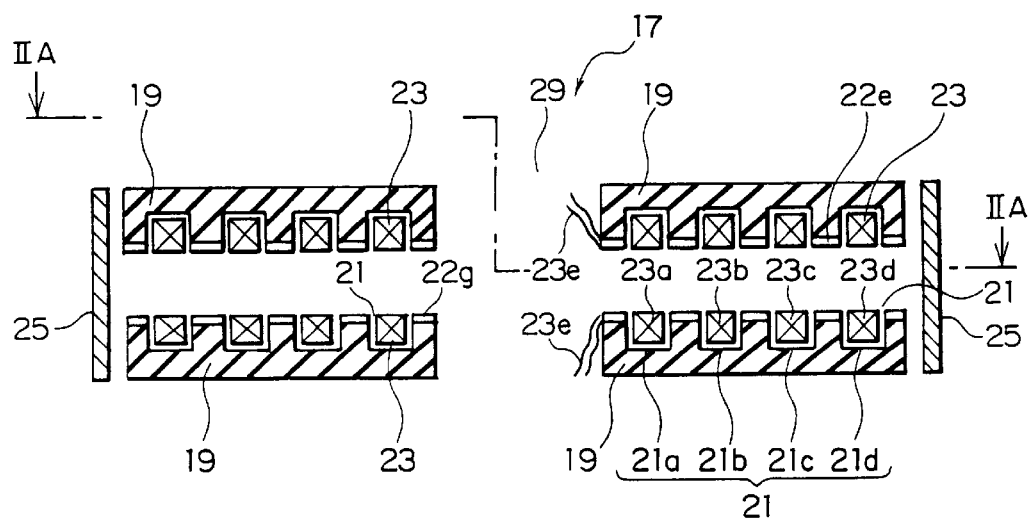
FIG. 2B is a side sectional view taken along a line IIB—IIB in FIG. 2A.

Referring to FIGS. 2A and 2B, a non-contact transformer 17 as a first basic structure has a pair of disc-shaped or donut-shaped cores 19 that are opposed to each other with a gap interposed therebetween, a through holes 29 for penetrating a handle-shaft of a car, circular wires (or windings) 23 that are accommodated in grooves 21 that are formed concentrically in the cores 19 but merely partially shown in FIG. 2A, a magnetic sleeve 25 provided at the outer circumference. Lead-out or radial grooves 22 are formed in a radial direction to lead out end portions 23e of windings 23 accommodated in the grooves 21. Each core 19 is a combination of fan-shaped partial cores 27 and has a disc or ring shape that having a hole at the center.

Whereas in a conventional technique each disc-shaped core is formed integrally, in the first basic structure of the present invention each core 19 is a combination of the fan-shaped partial cores 27. Since the partial cores 27 are small, the problem of warping during sintering is solved.

As described above, according to the first basic structure of the invention, since the core units can be made small by forming each disc-shaped core 19 as a combination of the fan-shaped partial cores 27, the amount of a warp caused by strain that occurs during sintering can be restricted to an allowable range.

In attachment work of the non-contact transformer 17 having the cores 19, each of which is a combination of the partial cores 27, the disc-shaped cores 19 are merely formed that are mounted with the windings 23 (windings of conductive wire) and then the cores 19 are opposed to each other. Therefore, the attachment work can be made simpler than in the case of the conventional wired electric signal relay apparatus.

Since the main body side electric system and the steering wheel side electric system are located on both sides of the boundary between the cores 19 and hence are mechanically independent of each other, there occurs no sound of rubbing between wires or resistance during steering wheel manipulations.

Further, by also providing the cylindrical or pot-shaped magnetic sleeve 25 at one or both of the outer circumference and the inner circumference of the cores 19 that are opposed to each other, the leakage of magnetic flux to the outside is reduced and the coupling between the primary windings and the secondary windings is improved, whereby the transmission efficiency is increased. Since the magnetic sleeve 25 also functions as a magnetic shield that prevents magnetic flux caused by external noise waves from crossing the windings 23, signal transmission becomes less prone to adverse effects of external noise waves.

Next, a description will be made as regards a specific non-contact transformer based on the first basic structure according to the invention.

Figure 3A:
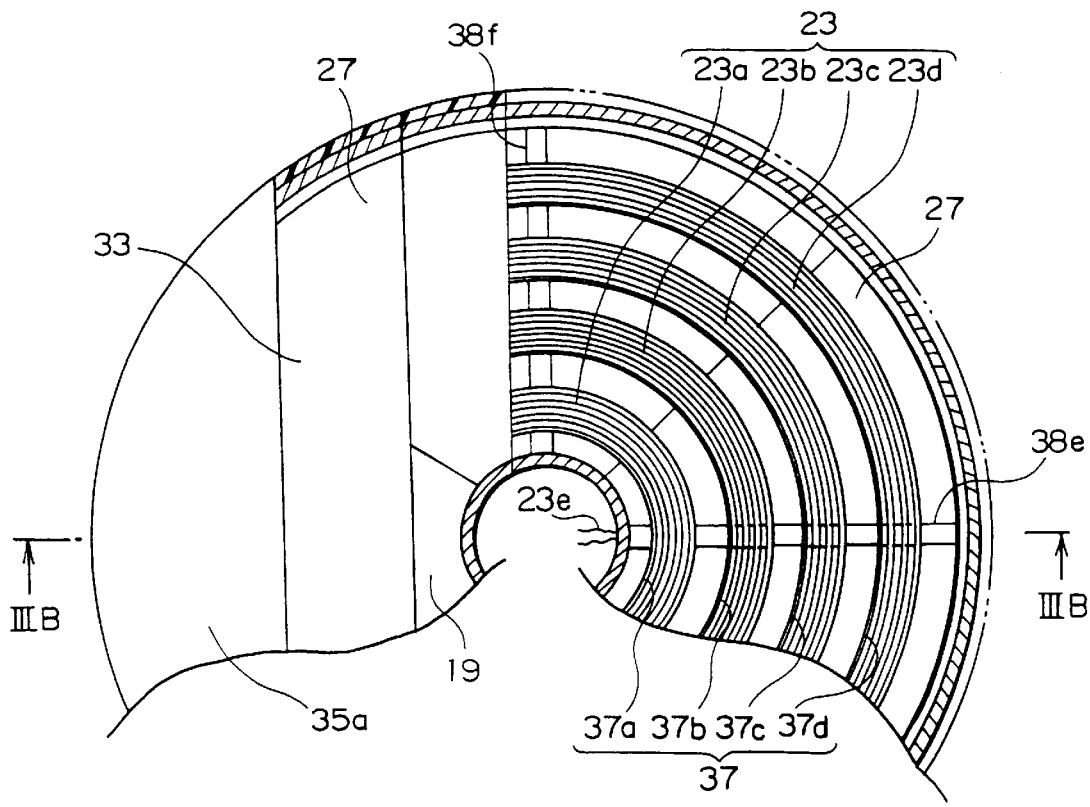
FIG. 3A is a partial plan sectional view of a specific non-contact transformer based on the first basic structure of FIGS. 2A and 2B taken along a line IIIA—IIIA in FIG. 3B.
Figure 3B:
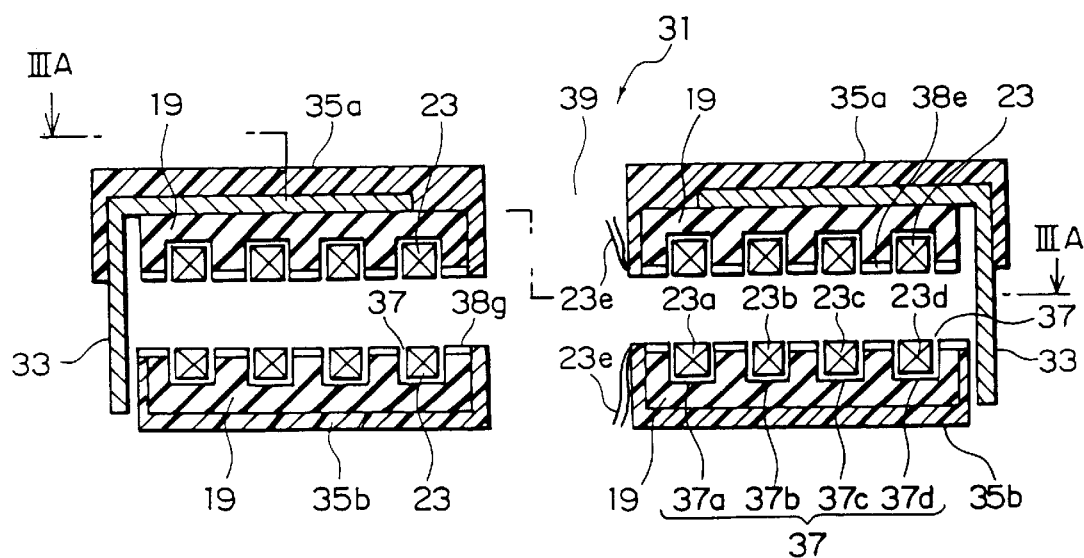
FIG. 3B is a sectional view taken along a line IIIB—IIIB in FIG. 3A.

Referring to FIGS. 3A and 3B, a transformer 31 is composed of windings 23, donut-shaped cores 19, a magnetic sleeve 33 made of a magnetic steel sheet, and a holder 35 which comprises upper and lower partial holders 35a and 35b. Each of the windings 23 is formed into a circular shape but all features are not shown in FIG. 3A. Each of the donut-shaped cores 19 measures 75 mm in outer diameter, 48 mm in inner diameter, and 3 mm in thickness and is a combination of four ferrite partial cores 27. Each of the ferrite partial cores 27 has concentric grooves 37 (37a–37d) and radial grooves 38 (38e, 38f, 38g, . . . ). The concentric grooves 37 are formed in a depth approximately equal to a height of the windings 23 and the radial grooves 38 are formed in a depth approximately equal to a diameter of each of wires constituting the windings 23 to lead out the end portions 23e of the windings 23. The magnetic sleeve 33 is made of a magnetic steel sheet. The upper partial holder 35a holds the donut-shaped core 19 and the magnetic sleeve 33 while the lower partial holder 3b holds only the donut-shaped core 19. The cores 19 are made of Mn-Zn type ferrite having a composition of 52.7 mol % $Fe_2O_3$, 39.3 mol % MnO, and 8.0 mol % ZnO. The magnetic sleeve 33 is formed to be a pot shape by welding a cylinder measuring 77 mm in inner diameter and formed by performing sheet metal working and welding on a magnetic steel plate of 1 mm in thickness and 10 mm in width to a disc made of the same material as the cylinder and measuring 79 mm in outer diameter, 60 mm in inner diameter, and 1 mm in thickness. The magnetic sleeve 33 is fixed to the ferrite cores 19 by an adhesive (not shown) and the holder 35. The windings 23 are accommodated in the respective grooves 37 one by one and fixed to the ferrite cores 19 with an adhesive (not shown). In FIGS. 3A and 3B, a central through-hole 39 is drawn in a smaller diameter than its actual diameter.

In the transformer 31, use is made of the winding 23a accommodated in the innermost groove 37a among the four concentric grooves 37a–37d for power supply. Use is also made of the other windings 23b–23d for signal transmission. Transmission efficiency was measured actually of the non-contact transformer 31. As an input (12 V/15 W), use is made of a sinusoidal wave of frequency 125 kHz generated by a function generator. An output was measured with a spectrum analyzer, and an output power of 7 W was obtained.

In a measurement that was conducted in the same manner with an exception that the magnetic sleeve 33 was absent, an output power was as low as 4 W.

The position of a power winding is not limited to the above-described one; for example, it may be provided in the outermost groove or the second groove from the outside. The number of grooves formed in each core 19 is not limited to four. The shape of the magnetic sleeve 33 is not limited to the pot shape; for example, a cylindrical magnetic sleeve 33 may be provided at one or both of the outer circumference and the inner circumference of the cores 19 that are opposed to each other.

Next, a non-contact transformer as a second basic structure according to the invention will be described with reference to FIGS. 4A and 4B.

Figure 4A:
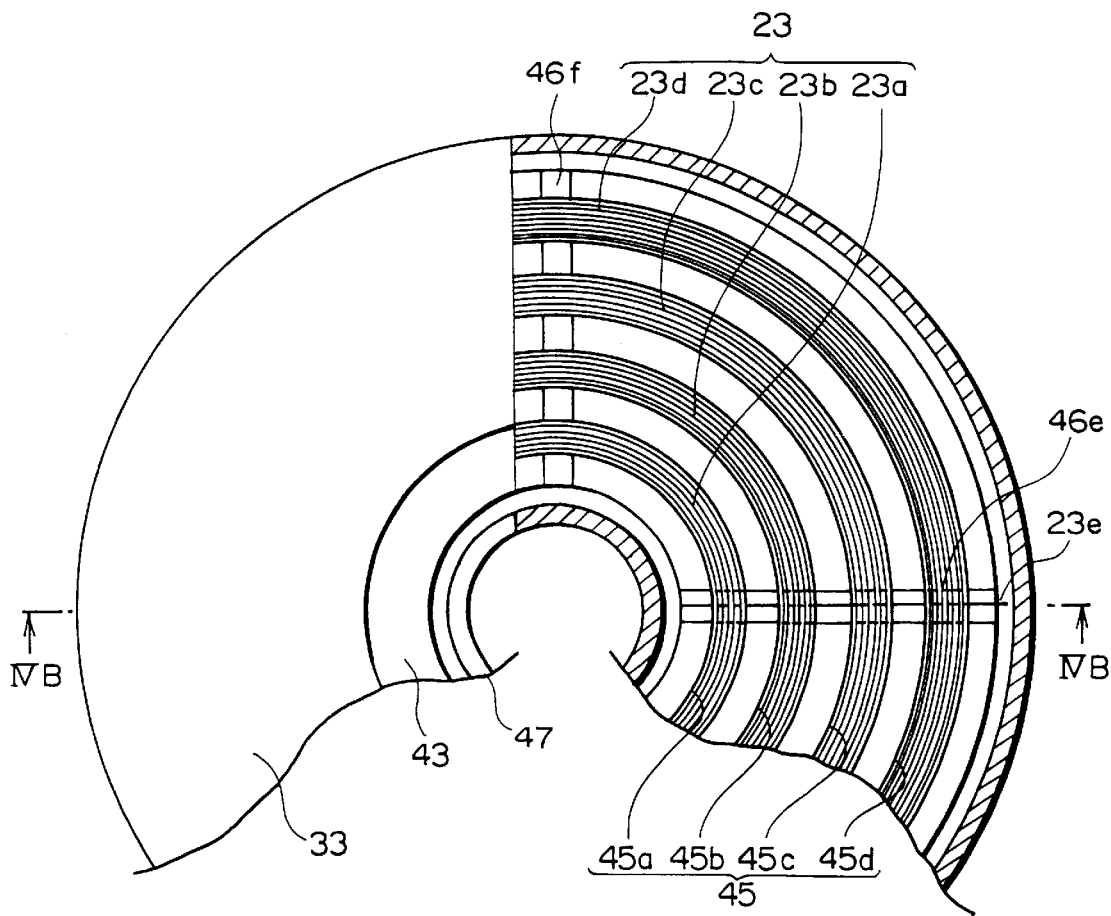
FIG. 4A is a partial plan sectional view of a non-contact transformer as a second basic structure according to the invention taken along a line IVA—IVA in FIG. 4B.
Figure 4B:
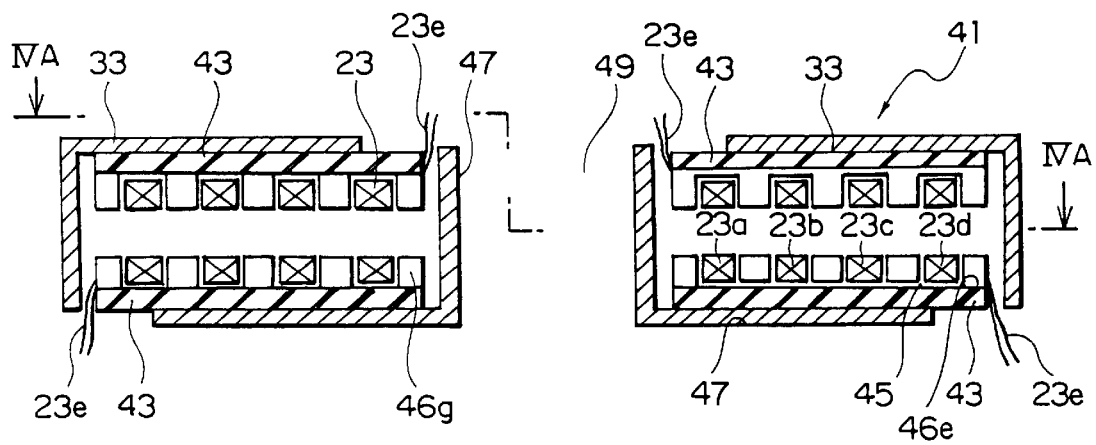
FIG. 4B is a sectional view taken along a line IVB—IVB in FIG. 4A.

Referring to FIGS. 4A and 4B, a non-contact transformer 41 as the second basic structure according to the invention is composed of a pair of disc-shaped or donut-shaped cores 43, windings 23, a magnetic sleeve 33, and a magnetic sleeve 47. The pair of disc-shaped cores 43 are opposed to each other with a space left therebetween. Concentric grooves 45 are formed in the disc-shaped cores 43 on the opposed surface sides with a depth approximately equal to a height of the windings 23. Radial grooves 46 (46e, 46f) are formed deeper than each of the concentric grooves 45 by a depth approximately equal to a diameter of each of wires constituting the windings 23. The windings 23 are formed into a circular shape and accommodated in the respective concentric grooves 45 but all features are not shown in FIG. 4A. The end portions 23e of the windings 23 are led out through the radial grooves 46, such as 46e, 46f, and 46g. The magnetic sleeve 33 has an outer cylindrical surface and a concave cross-section. The magnetic sleeve 47 has an inner cylindrical surface and a convex cross-section. In FIGS. 4A and 4B, a central through-hole 49 is drawn in a smaller diameter than its actual diameter.

Whereas conventionally the disc-shaped core is made of ferrite, in the second basic structure according to the invention the cores 43 are made of a metal magnetic material whose permeability is greater than or equal to that of ferrite materials. By forming the cores 43 with a metal magnetic material, the problems of ferrite cores, that is, cracking and warping during sintering can be solved without changing the characteristics of the cores 43 other than the hysteresis loss and the eddy current loss.

Further, it becomes possible to integrate the cores 43 with the magnetic sleeves 33 and 47. In this case, magnetic flux flows more smoothly between the cores 43 and the sleeves 33 and 47, whereby magnetic coupling between the windings 23 is improved and hence better characteristics can be obtained.

Metal magnetic materials to be used as core materials in the second basic structure according to the invention are higher in ductility and malleability than ferrite materials that are sintered bodies and hence are damaged less easily by external stress than the latter. Since such metal magnetic materials can be deformed by external force, the problems of cracking and warping can be solved by forming the cores 43 of the non-contact transformer 41 with a metal magnetic material whose permeability is greater than or equal to that of ferrite materials.

By using the magnetic sleeves 33 and 47 that are cylindrical or have a pot shape having an opening at the center of the bottom surface in such a manner as to be in contact with at least one of the bottom surface, the outer circumference, and the inner circumference of the opposed cores 43 or by forming the magnetic sleeves 33 and 47 integrally with the opposed cores 43, magnetic flux that leaks outward is reduced and hence the coupling between the primary windings and the secondary windings is improved, whereby the transmission efficiency can be increased.

Next, a specific non-contact transformer based on the second basic structure according to the invention will be described with reference to FIGS. 5A and 5B.

Figure 5A:
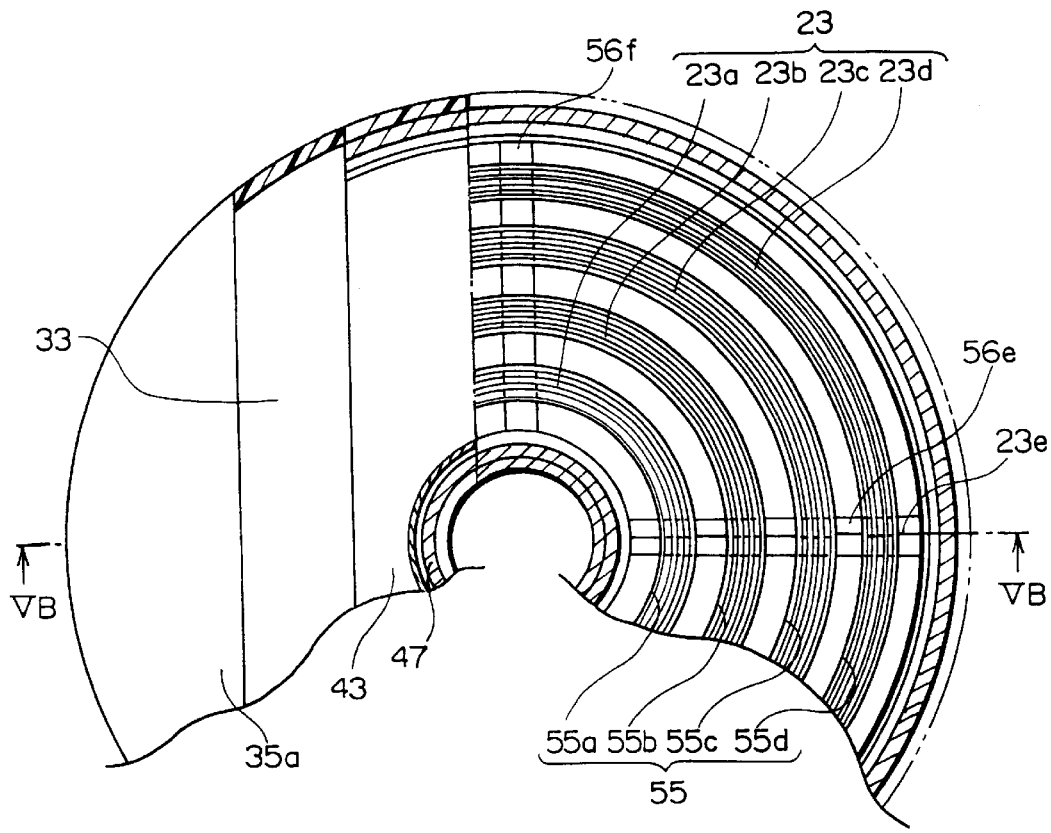
FIG. 5A is a partial sectional plan view of a specific non-contact transformer based on the second basic structure of FIGS. 4A and 4B taken along a line VA—VA in FIG. 5A.
Figure 5B:
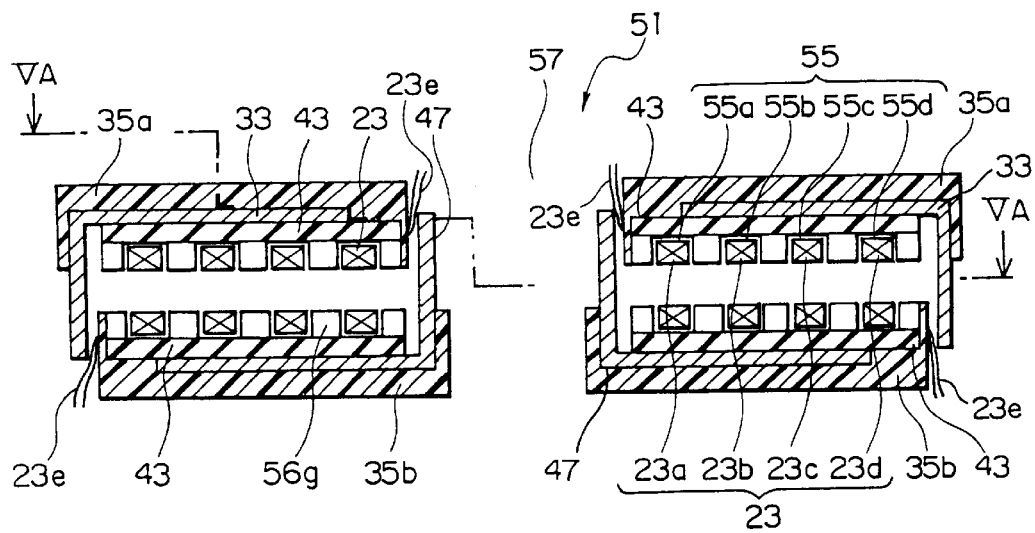
FIG. 5B is a sectional view taken along a line VB—VB in FIG. 5A.

Referring to FIGS. 5A and 5B, a transformer 51 is composed of circular windings 23 (all of the parts being not shown in FIG. 5A), donut-shaped cores 43, magnetic sleeves 33 and 47, and a holder 35. Each of the windings 23 is 30 turns of a insulating-coated conductive wire, such as a polyvinyl formal coated copper wire of 0.4 mm in diameter. Each of the donut-shaped cores 43 are formed by punching and pressing a 45% Ni-Fe magnetic steel sheet and measures 75 mm in outer diameter, 48 mm in inner diameter, and 2 mm in thickness and has concentric grooves 55 and radial grooves 56e, 56f, and 56g. The concentric grooves 55 (55a, 55b, 55c, 55d) are formed to accommodate the windings 23. The radial grooves 56e, 56f, 56g, . . . are formed deeper than the concentric grooves 55 by a depth equal to a diameter of each wire of windings to lead out the end portions 23e of the windings 23 therethrough. The magnetic sleeves 33 and 47 are of 1 mm in thickness and 10 mm in width and are made of the same magnetic steel sheet as the cores 43 are. The holder 35 holds the cores 43 and the magnetic sleeves 33 and 47.

Although not shown in FIG. 5, the bottom surface of each of the cores 43 are actually waved at an amplitude of about 0.5 mm as a result of press working.

The magnetic sleeves 33 and 47 are fixed to the cores 43 by an adhesive (not shown) and the holder 35. The one magnetic sleeve 33 has a concave cross-section and the other magnetic sleeve 47 has a convex cross section. The two magnetic sleeves 33 and 47 are arranged so as to surround the cores 43. In FIG. 5, a central through-hole 57 is drawn in a smaller diameter than its actual diameter.

The windings 23 are accommodated in the respective grooves 55 one by one and fixed to the cores 43 with an adhesive. In the transformer 51, the winding 23a is accommodated in the innermost groove 55a among the four concentric grooves 55a–55d and is used for power supply while the other windings 23b–23d are used for signal transmission. Transmission efficiency was measured actually of the non-contact transformer 51. A sinusoidal wave of frequency 25 kHz generated by a function generator was used as an input (12 V/15 W). An output was measured with a spectrum analyzer, and an output power of 7.3 W was obtained.

In the same manner with an exception that the magnetic sleeves 33 and 47 were absent, measurement was conducted. As a result, an output power was as low as 3.9 W.

Further, similar measurements above-described were conducted by replacing the cores 43 with cores made of a Mn-Zn type ferrite material having a composition of 57 mol % $Fe_2O_3$, 39.3 mol % MnO, and 8.0 mol % ZnO. An output power of 7.0 W was obtained when the magnetic sleeves 33 and 47 were used, while an output power of 4.0 W was obtained when the magnetic sleeves 33 and 47 were not used.

The position of a power forming winding is not limited to the above-described one; for example, it may be provided in the outermost groove or the second rove from the outside. The number of grooves 55 formed in each core 43 is not limited to four. The shape of the bottom surface of each core 43 is not limited to the above-described one.

The shape of the magnetic sleeves 33 and 47 is not limited to the pot shape; for example, a cylindrical magnetic sleeve may be provided at one or both of the outer circumference and the inner circumference of the opposed cores 43.

Further, the core material is not limited to the above-described one. Other materials, such as an Fe metal and a Co-Fe type alloy, may be used as long as their relative permeability is greater than or equal to that of ferrite. The Mn-Zn type ferrite material having a composition of 52.7 mol % $Fe_2O_3$, 39.3 mol % MnO, and 8.0 mol % ZnO has relative permeability of about 5,000. For example, most of metal magnetic materials such as Fe, Ni-Fe, and Co-Fe types have larger relative permeability values (>8,000).

Similar measurements above-described where conducted by using magnetic sleeves 33 and 47 made of a small relative permeability material that was manufactured by grinding a 30% Ni-Fe alloy into particles of about 150 $\mu$m and mixing those with an epoxy resin. An output power of 7.0 W or more. The output power was obtained in the same level as in the case of using the above-mentioned Mn-Zn type ferrite cores, even when the relative permeability of the sleeve material was reduced to about 1,100.

Next, another specific non-contact transformer based on the second basic structure according to the invention will be described with reference to FIGS. 6A and 6B.

Figure 6A:
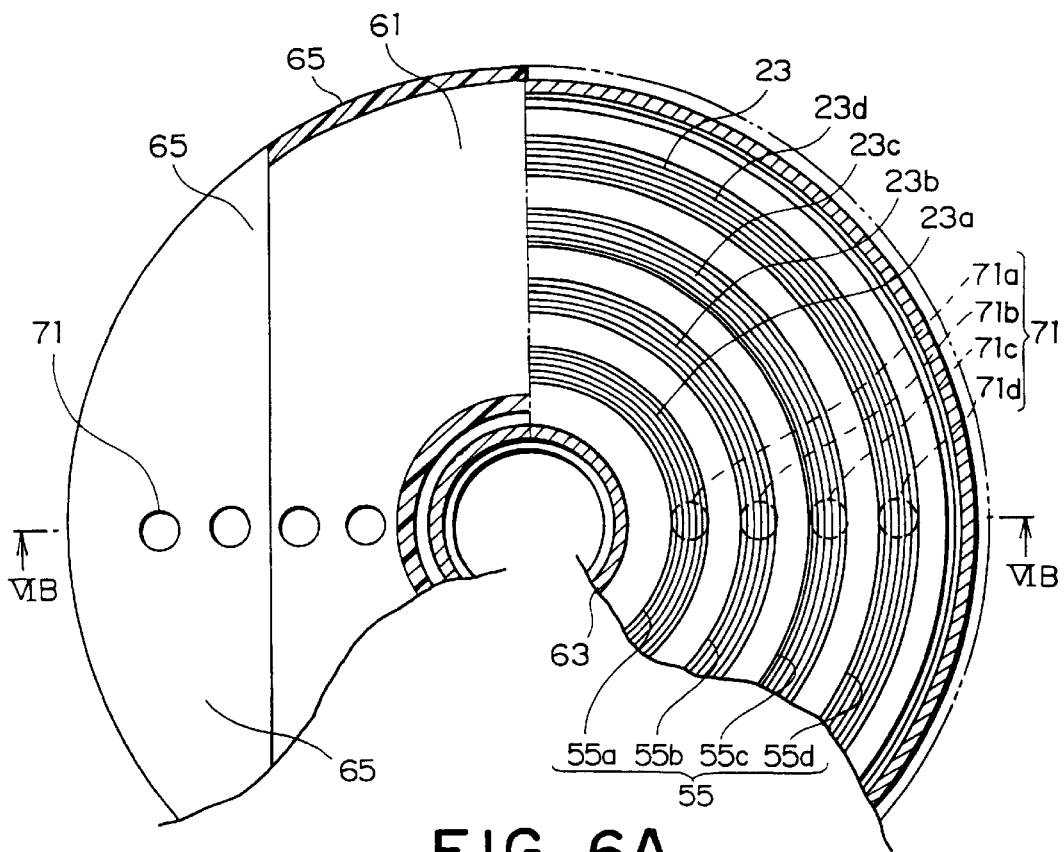
FIG. 6A is a partial sectional plan view of another specific non-contact transformer based on the second basic structure of FIGS. 4A and 4B taken along a line VIA—VIA in FIG. 6B.
Figure 6B:
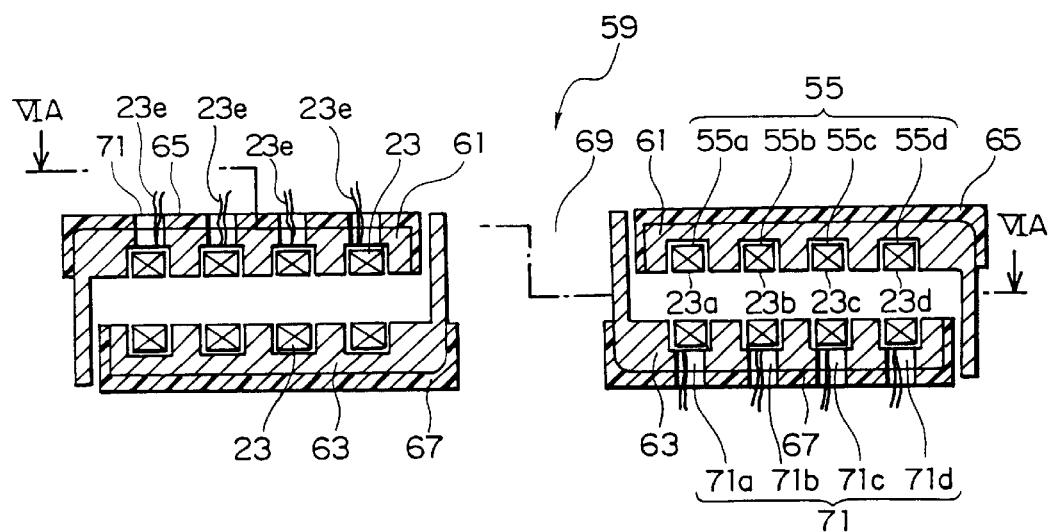
FIG. 6B is a sectional view taken along a line VIB—VIB in FIG. 6A.

Referring to FIGS. 6A and 6B, a non-contact transformer 59 uses a core 61 formed by integrating the magnetic sleeve 33 and the associated core 43 shown in FIGS. 5A and 5B and a core 63 formed by integrating the magnetic sleeve 47 and the associated core 43.

A 45% Ni-Fe magnetic steel sheet of 2 mm in thickness is used as a metal magnetic material. Concentric grooves 55 are formed for accommodating windings 23 and formed with lead-out holes 71 throughout the cores 43 for taking out the end portions 23e of the windings 23 accommodated in the grooves 23. Furthermore, the lead-out holes 71 are made from the cores 43 throughout the holders 67 and 65, respectively. The lead-out holes 71 may be through holes or openings. Each of the windings is 30 turns of a insulating-coated conductive wire, such as a polyvinyl formal coated copper wire that is 0.4 mm in diameter. The grooves 55 communicate with respective wire-lead-out holes (not shown). The integral cores 61 and 63 are fixed to respective holders 65 and 67 with an adhesive. One of the cores 61 and 63 has a concave cross-section and the other has a convex cross-section, and the cores 61 and 63 are so arranged as to surround the windings 23. In FIGS. 6A and 6B, a central through-hole 69 is drawn in a smaller diameter than its actual diameter.

The windings 23 are accommodated in the respective grooves 55 one by one and fixed to the cores 61 and 63 with an adhesive. In the transformer 59, the winding 23a is accommodated in the innermost groove 55a among the four concentric grooves 55a–55d and is used for power supply while the other windings 23b–23d are used for signal transmission. Transmission efficiency of the non-contact transformer 59 was actually measured in the same manner as described above. A sinusoidal wave of frequency 25kHz was generated by a function generator and was used as an input (12 V/15 W). An output was measured with a spectrum analyzer, and an output power of 7.5 W was obtained.

Another measurements were conducted for the above-described transformers in which a pulse signal of 1 V was applied to a signal transmission winding and how signal transmission proceeded was measured with an oscilloscope. Specifically, a mobile telephone on the market was used as an external noise wave source. Noise waves were transmitted from a position 40 cm distant from the transformer. Whereas no change was found when the magnetic sleeve(s) 25, 33, or 47 was used, a signal waveform was distorted when no magnetic sleeve was used.

As described above, in contrast to the conventional case in which power supply and signal transmission are performed in a wired manner by using flexible wires having resilience, in the invention they are performed through electromagnetic induction by using a non-contact transformer. Therefore, attachment work is simplified and no sound of rubbing between wires or resistance during steering wheel manipulation occurs.

In another aspect of the invention, opposed cores and a magnetic sleeve are used, whereby the transmission efficiency can be increased. Further, each core of the transformer is a combination of fan-shaped cores and has a disc shape. This makes it possible to provide a non-contact transformer which can be manufactured easily by virtue of a minimized warp of a core that occurs during its manufacture.

In still another aspect of the invention, a metal magnetic material, rather than a sintered body such as ferrite, is used to form cores of the transformer. This solves such problems as warping during manufacture of a core and cracking during assembling work and enables integration of cores and a magnetic sleeve. Therefore, a non-contact transformer can be provided which can be manufactured and assembled very easily.

Further, the invention makes it possible to provide a non-contact transformer which suppresses adverse effects of external noise waves on signal transmission and thereby provides high stability of signal transmission.

What is claimed is:

1. A vehicular signal relay apparatus in which a non-contact transformer is accommodated in a steering wheel portion of a vehicle to relay an electric signal on power, the non-contact transformer comprising:

at least one pair of windings of wire;

two disc-shaped magnetic cores each having at least one concentric groove in which the at least one of the windings is accommodated; and at least one magnetic sleeve that covers at least outer circumferences of the two magnetic cores, wherein the two magnetic cores are opposed to each other with a predetermined distance left therebetween in a space enclosed by the magnetic sleeve.

2. The vehicular signal relay apparatus according to claim 1, wherein the at least one magnetic sleeve has a shape that is selected from a cylindrical shape, a pot shape having an opening at a center of a bottom surface, a concave cross-section shape having an opening at a center of a bottom surface, and a convex cross-section shape having an opening at a center of a bottom surface.

3. The vehicular signal relay apparatus according to claim 2, wherein at least one of the magnetic cores and the magnetic sleeve is substantially made of a metal magnetic material.

4. The vehicular signal relay apparatus according to claim 3, wherein the at least one magnetic sleeve is in contact with at least one of a bottom surface, an outer circumference, and an inner circumference of one of the magnetic cores.

5. The vehicular signal relay apparatus according to claim 1, wherein each of the magnetic cores further has at least one of radial grooves or at least one of lead-out holes for leading out end portions of the windings therethrough.

6. A non-contact transformer comprising:

at least one of windings of wire;

two disc-shaped magnetic cores each having at least one concentric groove in which the at least one of the windings is accommodated, respectively; and at least one magnetic sleeve that covers at least outer circumferences of the two magnetic cores;

wherein the two magnetic cores are opposed to each other with a predetermined distance left therebetween in a space enclosed by the magnetic sleeve.

7. The non-contact transformer according to claim 6, wherein the at least one magnetic sleeve has a shape that is selected from a cylindrical shape, a pot shape having an opening at a center of a bottom surface, a concave cross-section shape having an opening at a center of a bottom surface, and a convex cross-section shape having an opening at a center of a bottom surface.

8. The non-contact transformer according to claim 7, wherein at least one of the magnetic cores and the magnetic sleeve is substantially made of a metal magnetic material.

9. The non-contact transformer according to claim 8, wherein the at least one magnetic sleeve is in contact with at least one of a bottom surface, an outer circumference, and an inner circumference of one of the magnetic cores.

10. The non-contact transformer according to claim 9, wherein each of the magnetic cores further has at least one of radial grooves or at least one of lead-out holes for leading out end portions of the windings therethrough.

11. The non-contact transformer according to claim 10, wherein each of the magnetic cores is a combination of a plurality of fan-shaped cores and has a disc shape.

12. The non-contact transformer according to claim 11, wherein each of the fan-shaped cores is a ferrite sintered body.

13. The non-contact transformer according to claim 8, wherein each of the magnetic cores further has at least one groove or opening for leading out an end portion of the winding.

14. The non-contact transformer according to claim 13, wherein the magnetic sleeve and one of the magnetic cores are an integrally formed metal magnetic member.

* * * * *